United States Patent
Koshi et al.

(10) Patent No.: US 7,606,419 B2
(45) Date of Patent: Oct. 20, 2009

(54) TRANSLATED DOCUMENT IMAGE PRODUCTION DEVICE, RECORDING MEDIUM AND TRANSLATED DOCUMENT IMAGE PRODUCTION METHOD

(75) Inventors: Yutaka Koshi, Ashigarakami-gun (JP); Shunichi Kimura, Ashigarakami-gun (JP)

(73) Assignee: Fuji Xerox Co., Ltd., Tokyo (JP)

( * ) Notice: Subject to any disclaimer, the term of this patent is extended or adjusted under 35 U.S.C. 154(b) by 527 days.

(21) Appl. No.: 11/213,784

(22) Filed: Aug. 30, 2005

(65) Prior Publication Data

US 2006/0204111 A1    Sep. 14, 2006

(30) Foreign Application Priority Data

Mar. 8, 2005    (JP) .............................. 2005-064130

(51) Int. Cl.
*G06K 9/34* (2006.01)
*G06K 9/18* (2006.01)
*G06K 9/72* (2006.01)
*G06K 9/36* (2006.01)

(52) U.S. Cl. ...................... 382/176; 382/182; 382/229; 382/276; 704/2

(58) Field of Classification Search ................. 382/276, 382/176–179, 182, 185, 186, 229; 704/2–7
See application file for complete search history.

(56) References Cited

U.S. PATENT DOCUMENTS

| | | | | |
|---|---|---|---|---|
| 5,222,160 A | * | 6/1993 | Sakai et al. | 382/185 |
| 5,701,365 A | * | 12/1997 | Harrington et al. | 382/212 |
| 5,917,944 A | * | 6/1999 | Wakisaka et al. | 382/190 |
| 6,539,116 B2 | * | 3/2003 | Takaoka | 382/229 |
| 6,954,498 B1 | * | 10/2005 | Lipton | 375/240.08 |
| 2003/0004989 A1 | * | 1/2003 | Tomasi | 707/507 |
| 2006/0204111 A1 | * | 9/2006 | Koshi et al. | 382/229 |
| 2007/0127043 A1 | * | 6/2007 | Maekawa | 358/1.9 |
| 2008/0233980 A1 | * | 9/2008 | Englund et al. | 455/466 |

FOREIGN PATENT DOCUMENTS

| JP | A 5-274397 | 10/1993 |
|---|---|---|
| JP | A 2002-108855 | 4/2002 |

* cited by examiner

*Primary Examiner*—Aaron W Carter
(74) *Attorney, Agent, or Firm*—Oliff & Berridge, PLC

(57) ABSTRACT

A translated document image production device has an extraction section, a translation section and a region backfill section. The extraction section extracts a group of pixels to be processed, the group of pixels having pixels for constituting a character or a character string. The translation section translates the character or character string. The region backfill section backfills the extracted group of pixels to maintain the background of the translated character or character string and that writes the translated character and character string.

10 Claims, 3 Drawing Sheets

BLUE  BLACK

TRANSLATED DOCUMENT IMAGE PRODUCTION DEVICE, RECORDING MEDIUM AND TRANSLATED DOCUMENT IMAGE PRODUCTION METHOD

BACKGROUND OF THE INVENTION

1. Field of the Invention

The present invention relates to technologies for translating a bitmapped document.

2. Description of the Related Art

Various technologies have been proposed up to the present in order to scan a document provided on a paper medium and optimally handle the document as document data. For example, Japanese Patent Application Laid-Open Publication H05-274397 discloses technology that performs character discrimination in a scanned document, and after appropriately modifying the contents of that data, exchanges it between remote devices. Also, Japanese Patent Application Laid-Open Publication 2002-108855 discloses technology that recognizes characters with high accuracy, even from a portion of a document that includes maps, illustrations, or the like.

In the past, attempts have been made to replace only the character portion of a document with new characters translated into another language, while maintaining the appearance of colors, patterns, and the like that form the background of the document, by altering the document data, obtained by scanning the document, at the pixel level. Ordinarily, document data is provided as a bitmap wherein the contents of the scanned document are displayed by pairs of pixel location and pixel value. Accordingly, when a new character obtained by translating a character inscribed in that region is overwritten as-is in the region within the bitmap, as shown in FIG. 4 (A), because the overwriting character lies on top of the originally inscribed character, its legibility is significantly compromised. On the other hand, it is certainly possible to avoid a piling of characters if the new characters are written after the pixel value of the pixels constituting the originally present character is set once to white. However, even when adopting this sort of method, when the background of the document is drawn in a color or pattern other than white, as shown in FIG. 4 (B), a white outline of the character remains in the background of the document, compromising legibility in the same manner as before.

The present invention has been made in view of the above circumstances, and provides an arrangement with which it is possible to replace only the character portion of a document with new characters translated into another language, while maintaining the appearance of colors, patterns, and the like that form the background of the document.

SUMMARY OF THE INVENTION

According to an aspect of the present invention, there is provided a translated document image production device. The translated document image production device has an extraction section, a translation section and a region backfill section. The extraction section extracts a group of pixels to be processed, the group of pixels having pixels for constituting a character or a character string. The translation section translates the character or character string. The region backfill section backfills the extracted group of pixels to maintain the background of the translated character or character string and that writes the translated character and character string.

According to an embodiment of the present invention, it is possible to replace only the character portion of a document with new characters translated into another language, while maintaining the appearance of colors, patterns, and the like that form the background of the document.

BRIEF DESCRIPTION OF THE DRAWINGS

Embodiments of the present invention will be described in detail based on the following figures, wherein.

DETAILED DESCRIPTION OF THE INVENTION

Embodiment of the Invention

Below follows a description of an embodiment according to the present invention.

In the present embodiment, after discriminating a character from a bitmapped image obtained by scanning a document wherein text is printed in black on paper of a single color, a new translated character is written after backfilling the pixels constituting that character with pixels that have the same attributes as the paper.

Figure 1:
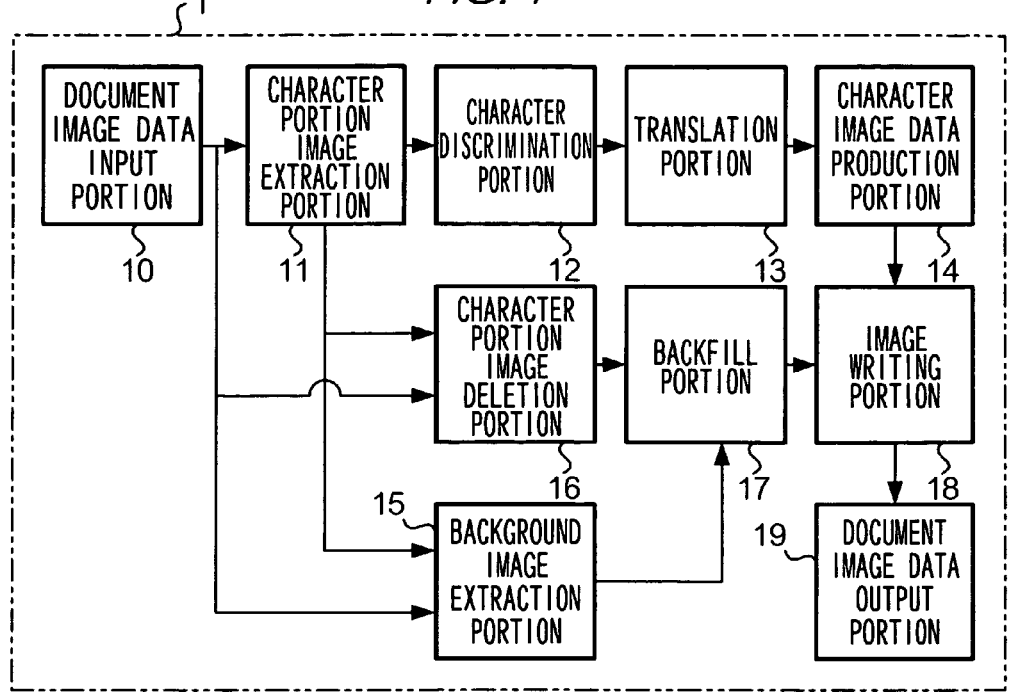
FIG. 1 is a hardware configuration diagram of the translated document image production device.

FIG. 1 is a block diagram that shows the hardware configuration of the translated document image production device 1 according to the present embodiment. As shown in FIG. 1, the translated document image production device 1 is provided with a document image data input portion 10, a character portion image extraction portion 11, a character discrimination portion 12, a translation portion 13, a character image data production portion 14, a background image extraction portion 15, a character portion image deletion portion 16, a backfill portion 17, an image writing portion 18, and a document image data output portion 19.

The document image data input portion 10 inputs a bitmap image of the document into the device 1 itself The bitmap image inputted via the document image data input portion 10 has pairs including an address that indicates the position of the pixels constituting the document image and an RGB value that expresses the attributes of those pixels as an RGB 256 gradation. For example, an RGB value of (0, 0, 0) is shown when the pixel at a particular address is white, and an RGB value of (255, 255, 255) is shown when the pixel at a particular address is black.

The character portion image extraction portion 11 specifies one rectangular region from among various inscribed rectangular areas (hereinafter, a rectangular region to be processed will be referred to as a "processing target region") in the bitmap image to be processed that is input via the document image data input portion 10, and supplies position information that indicates the position of the specified processing target region to the background image extraction portion 15 and the character portion image deletion portion 16. Also, this character portion image extraction portion 11 extracts the group of pixels constituting the character in the processing target region. Based on the group of pixels extracted by the character portion image extraction portion 11, the character discrimination portion 12 identifies the character displayed by that group of pixels, and supplies the character code of the discriminated character to the translation portion 13. The translation portion 13 translates the character code supplied from the character discrimination portion 12 and obtains a new character code, and supplies the newly obtained character code to the character image data production portion 14. For example, when the character code of the Latin character "A" is supplied from the character discrimination portion 12, the character code of the Japanese hiragana character "あ" is supplied to the character image data production portion 14. The character image data production portion 14 produces image data corresponding to the character code supplied from the character discrimination portion 12, and supplies that character image to the image writing portion 18.

After specifying from the bitmap image the processing target region indicated by the position information supplied from the character portion image extraction portion 11, the background image extraction portion 15 extracts the RGB values of the pixels constituting the background of the character within that region.

On the other hand, after specifying from the bitmap image the processing target region indicated by the position information supplied from the character portion image extraction portion 11, the character portion image deletion portion 16 resets the RGB values of the pixels constituting the background of the character within that region to white (0, 0, 0). Then, the backfill portion 17 newly associates the same RGB values as those extracted by the background image extraction portion 15 with the addresses of the pixels reset by the character portion image deletion portion 16. Therefore, the pixels that constituted the character in the processing target region are replaced by pixels having the same RGB value as the pixels that constituted the background, and the area within the processing target region is concealed by pixels having the same color as the background.

In the processing target region that has been processed by the backfill portion 17, the image writing portion 18 fills the character image supplied from the character image data production portion 14.

When a bitmap image containing multiple characters is input from the document image data input portion 10, the region where each of those characters is inscribed is made a processing target region, and the processing performed by the processing portions described above is repeated. Thus, a new bitmap image is obtained that displays the translated document. The newly obtained bitmap image is output to an external printing device via the document image data output portion 19.

Transformation of the document bitmap image realized by the processing performed by the processing portions described above is specifically explained here with reference to FIG. 2 as an example. FIG. 2 (A) shows a bitmap image that has been input from the document image data input portion 10. As shown in FIG. 2 (A), in this bitmap image the Latin character "A" is drawn by the group of black pixels (RGB value: 255, 255, 255), and the background of this character is drawn by blue pixels (RGB value: 0, 255, 0). FIG. 2 (B) shows the bitmap image after being processed by the character portion image extraction portion 11. At this stage, the rectangular region in which the Latin character "A" is inscribed is specified as a processing target region X, and the character code of the character "A" shown by the group of black pixels within that processing target region X is supplied from the character discrimination portion 12 to the translation portion 13.

FIG. 2 (C) shows the bitmap image after being processed by the character portion image deletion portion 16. At this stage, by setting the RGB value of the pixels constituting the Latin character "A" to white, the character "A" is cut out in white from the processing target region X.

FIG. 2 (D) shows the bitmap image after being processed by the backfill portion 17. At this stage, by newly associating the background RGB value extracted by the background image extraction portion 15 with the addresses of the reset pixels, the entire processing target region X is concealed by the background color.

FIG. 2 (E) shows the bitmap image after being processed by the image writing portion 18. In this stage, the image of the Japanese hiragana character "あ" obtained by translation is newly written to approximately the center position of the processing target region X. This newly written character is produced by the character image data production portion 14 based on the character code supplied by the translation portion 13.

The translated document image production device 1 described above, after discriminating a character from the processing target region of the input bitmap image, writes a new character image obtained by translation after backfilling the pixels of the region in which that character is inscribed with the same color as the background. Accordingly, it is possible to avoid compromising the legibility of the written character due to some influence from the background color of the source document.

Modified Embodiments

Various modified embodiments of the invention are also possible.

The embodiment described above is constructed supposing a circumstance in which the background of the character in the input bitmap image is a single color, and is not suitable for translation of documents in which a pattern is pre-printed on paper. On the other hand, by furnishing the backfill portion 17 with a function as described below, it is possible to apply the present invention even to documents having a background that is not a single color. The backfill method described as a modified embodiment includes copying the processing target region and a separated background portion as a patch image, and after adjusting the size of the patch to an appropriate size, pasting it to the processing target region. In the present invention, any method may be adopted for that backfill method as is necessary, if the backfill portion 17 is furnished with a function that performs predetermined interpolation processing, matching the group of pixels extracted from the processing target region with the drawn content of pixel groups in the vicinity of the extracted group of pixels.

In the embodiment described above, after the character portion image deletion portion 16 sets the RGB value of the pixels constituting the character in the processing target region to white, the backfill portion 17 newly associates the same RGB values as those extracted by the background image extraction portion 15 with the addresses of the reset pixels. However, this resetting by the character portion image deletion portion 16 is not a required process in the present invention; the RGB value of the pixels constituting the character may be immediately replaced with the same RGB value as that extracted by the background image extraction portion 15.

In the embodiment described above, the backfill portion 17 newly associated the RGB value of the background extracted by the background image extraction portion 15 with the addresses of the pixels reset by the character portion image deletion portion 16. That is, the RGB value of the pixels backfilled by the backfill portion 17 was determined depending on the results of the extraction performed by the background image extraction portion 15. On the other hand, by pre-setting the RGB value backfilled by the backfill portion 17 to a default value indicating the primary colors white (RGB value: 0, 0, 0) and blue (RGB value: 0, 255, 0), a simple configuration may be adopted wherein it is not necessary to furnish the background image extraction portion 15.

Figure 3:
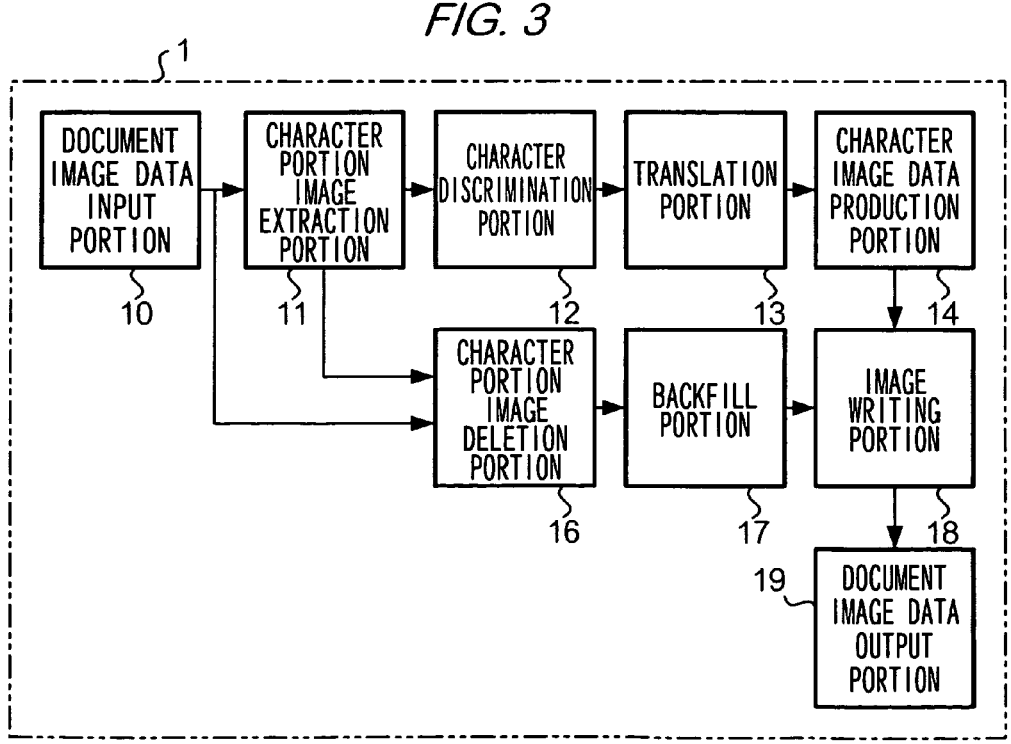
FIG. 3 is a hardware configuration diagram of the translated document image production device (in a modified embodiment)
Figure 2A:
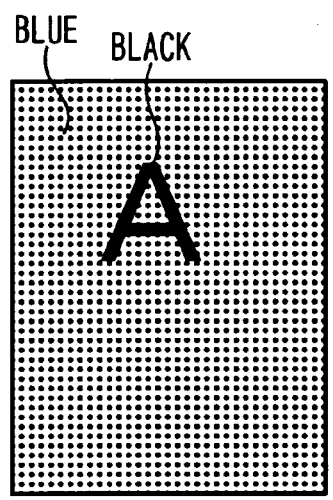
FIGS. 2(A), 2(B), 2(C), 2(D) and 2(E) are drawings that show the transformation of a bitmap image.
Figure 2B:
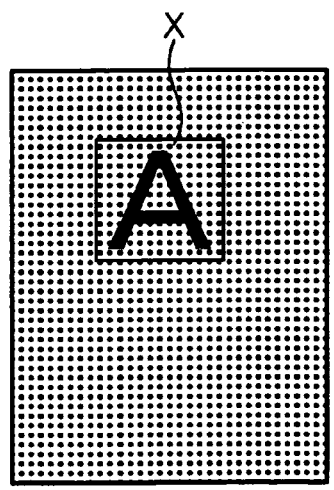
Figure 2C:
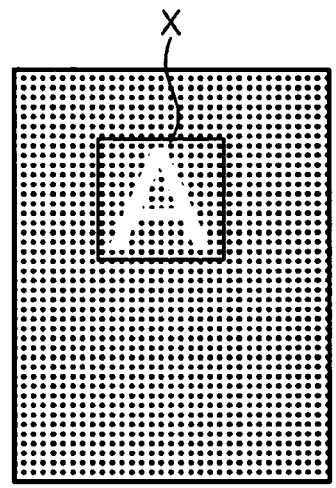
Figure 2D:
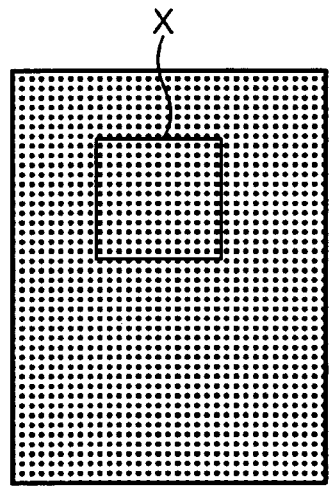
Figure 2E:
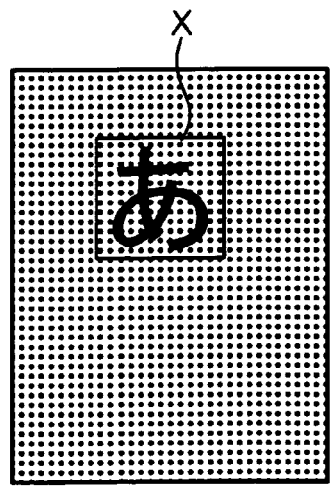
Figure 4A:
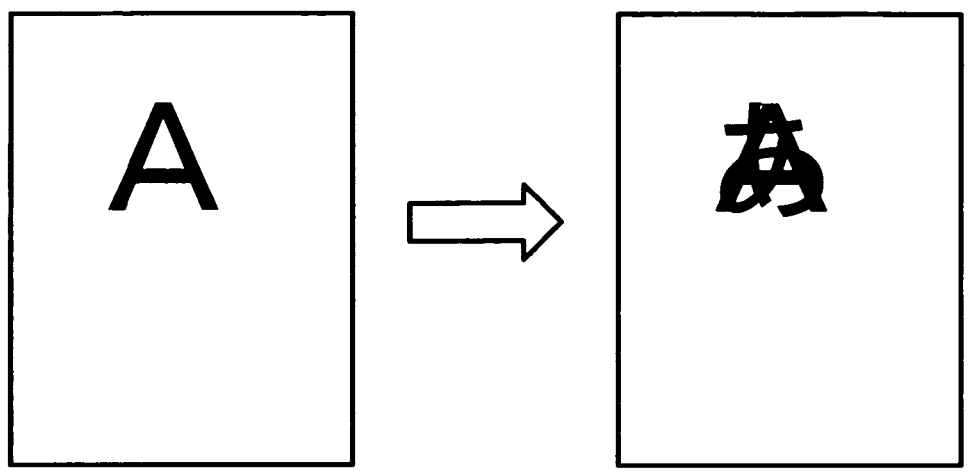
FIGS. 4(A) and 4(B) are drawings that illustrate the conventional technology.
Figure 4B:
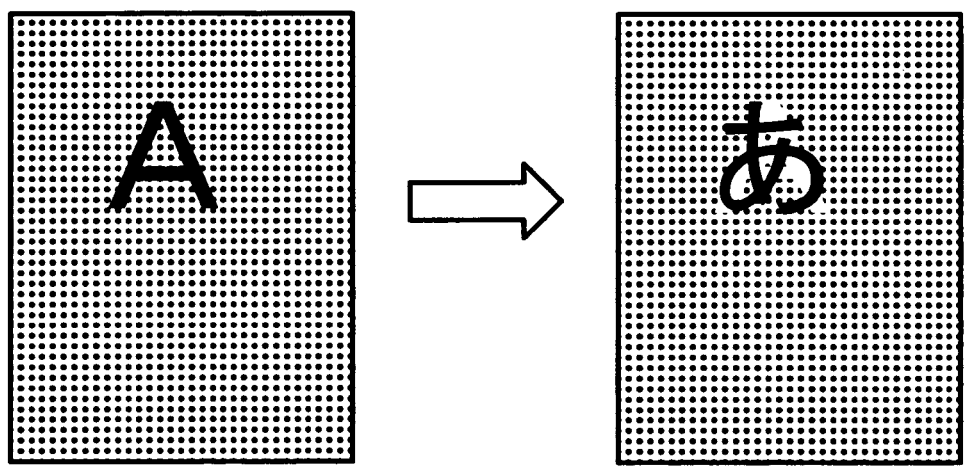

FIG. 3 is a block diagram that shows the hardware configuration of the translated document image production device 1 according to this modified embodiment. As shown in FIG. 3, the translated document image production device 1 according to this modified embodiment is provided with a document image data input portion 10, a character portion image extraction portion 11, a character discrimination portion 12, a translation portion 13, a character image data production portion 14, a character portion image deletion portion 16, a backfill portion 17, an image writing portion 18, and a document image data output portion 19, but unlike the translated document image production device 1 shown in FIG. 1, it does not include a background image extraction portion 15. Instead, in the backfill portion 17 in the present modified embodiment, a predetermined RGB value is set in advance for the pixels that should be backfilled as the background, and the backfill portion 17 newly associates this set RGB value with the address of the pixels reset by the character portion image deletion portion 16. Even with this sort of simple configuration, it is possible to realize the operation of the present invention.

The embodiment described above is configured with the translation portion 13 and the character image data production portion 14 as separate portions, but it is also possible to incorporate the function of the character image data production portion 14 into the translation portion 13. In the case of this modified embodiment, the translation portion 13 itself produces a new pixel group that displays the character indicated by the character code obtained by translation, and supplies it to the image writing portion 18.

In the embodiment described above, only one character is inscribed in a single processing target region, but it is also possible to make the processing target region a rectangular region including a character string for each predetermined group.

As described above, the present invention provides, in one aspect, a translated document image production device, having: an extraction section that extracts a group of pixels to be processed, the group of pixels having pixels for constituting a character or a character string; a translation section that translates the character or character string; and a region backfill section that backfills the extracted group of pixels to maintain the background of the translated character or character string and that writes the translated character and character string.

In this aspect, the region backfill section may backfill the extracted group of pixels by replacing the extracted group of pixels with pixels having the same pixel value as pixels in the vicinity of the extracted pixels.

Another aspect of the present invention is a translated document image production method, having: extracting a group of pixels to be processed, the group of pixels having pixels for constituting a character or a character string; translating the character or character string; and backfilling the extracted group of pixels to maintain the background of the translated character or character string and that writes the translated character and character string.

In this aspect, the extracted group of pixels may be backfilled by replacing the extracted group of pixels with pixels having the same pixel value as pixels in the vicinity of the extracted pixels.

Another aspect of the present invention is a storage medium readable by a computer, the storage medium storing a program of instructions executable by the computer to perform a function for producing a translated document, the function having: extracting a group of pixels to be processed, the group of pixels having pixels for constituting a character or a character string; translating the character or character string; and backfilling the extracted group of pixels to maintain the background of the translated character or character string and that writes the translated character and character string.

In this aspect, the extracted group of pixels may be backfilled by replacing the extracted group of pixels with pixels having the same pixel value as pixels in the vicinity of the extracted pixels.

Another aspect of the present invention is a translated document image production device, having: an input section that inputs a bitmap image obtained by scanning a document; an extraction section that specifies a region from the input bitmap image where a character or character string is inscribed, and extracts a group of pixels constituting the character or character string in the specified region; a character discrimination section that discriminates the character or character string displayed by the extracted group of pixels; a translation section that translates the discriminated character or character string, and obtains a new group of pixels that draw a new character or character string obtained by the translation; a region backfill section that replaces the extracted group of pixels with other pixels obtained by performing predetermined interpolation processing, matching the pixels constituting the character or character string in the specified region, with pixels constituting the background in the vicinity of those pixels; an image writing section that obtains a bitmap image of a translated document by writing the newly obtained group of pixels to the region in which the pixels have been replaced; and an output section that outputs the obtained bitmap image of the translated document.

In this aspect, the region backfill section may replace the extracted group of pixels with pixels having the same pixel value as pixels in the vicinity of the extracted pixels.

Another aspect of the present invention is a computer readable recording medium recording a program for causing a computer to execute: inputting a bitmap image obtained by scanning a document; specifying a region from the input bitmap image where a character or character string is inscribed, and extracting a group of pixels constituting the character or character string in the specified region; discriminating the character or character string displayed by the extracted group of pixels; translating the discriminated character or character string, and obtaining a new group of pixels that draw a new character or character string obtained by the translation; replacing the extracted group of pixels with other pixels obtained by performing predetermined interpolation processing, matching the pixels constituting the character or character string in the specified region, with pixels constituting the background in the vicinity of those pixels; obtaining a bitmap image of a translated document by writing the newly obtained group of pixels to the region in which the pixels have been replaced; and outputting the obtained bitmap image of the translated document.

In this aspect, the replacing step may have replacing the extracted group of pixels with pixels having the same pixel value as pixels in the vicinity of the extracted pixels.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

The entire disclosure of Japanese Patent Application No. 2005-064130 filed on Mar. 8, 2005 including specification, claims, drawings and abstract is incorporated herein by reference in its entirety.

What is claimed is:

1. A translated document image production device, comprising:
    an extraction section of the device that extracts a group of pixels constituting only a foreground of a character or a character string to be processed from pixels constituting a background of the character or character string;
    a translation section of the device that translates the character or character string into a translated character or character string; and
    a region backfill section of the device that backfills only the extracted group of pixels with pixel values representing the background of the character or character string and that writes the translated character or character string over the background.

2. The translated document image production device according to claim 1, wherein,
    the region backfill section backfills the extracted group of pixels by replacing the extracted group of pixels with pixels having a same pixel value as pixels in a vicinity of the extracted pixels.

3. A translated document image production method, comprising:
    extracting a group of pixels constituting only a foreground of a character or a character string to be processed from pixels constituting a background of the character or character string;
    translating the character or character string into a translated character or character string; and
    backfilling only the extracted group of pixels with pixel values representing the background of the character or character string and that writes the translated character or character string over the background,
    wherein the method is implemented by a computer.

4. The translated document image production method according to claim 3, wherein,
    the extracted group of pixels is backfilled by replacing the extracted group of pixels with pixels having a same pixel value as pixels in a vicinity of the extracted pixels.

5. A storage medium readable by a computer, the storage medium storing a program of instructions executable by the computer to perform a function for producing a translated document, the function comprising:
    extracting a group of pixels constituting only a foreground of a character or a character string to be processed from pixels constituting a background of the character or character string;
    translating the character or character string into a translated character or character string; and
    backfilling only the extracted group of pixels with pixel values representing the background of the character or character string and that writes the translated character or character string over the background.

6. The storage medium according to claim 5, wherein, the extracted group of pixels is backfilled by replacing the extracted group of pixels with pixels having a same pixel value as pixels in a vicinity of the extracted pixels.

7. A translated document image production device, comprising:
    an input section that inputs a bitmap image obtained by scanning a document;
    an extraction section that specifies a region from the input bitmap image where a character or character string is inscribed, and a group of pixels constituting only a foreground of a character or a character string to be processed from pixels constituting a background of the character or character string;
    a character discrimination section that discriminates the character or character string displayed by the extracted group of pixels;
    a translation section that translates the discriminated character or character string, and obtains a new group of pixels that draw a new character or character string obtained by the translation;
    a region backfill section that replaces only the extracted group of pixels with other pixels obtained by performing predetermined interpolation processing, matching the value of pixels constituting the character or character string in the specified region, with a value of pixels constituting the background in the vicinity of those pixels;
    an image writing section that obtains a bitmap image of a translated document by writing the new group of pixels to the region in which the pixels have been replaced; and
    an output section that outputs the obtained bitmap image of the translated document, wherein
    the sections are implemented using hardware.

8. The translated document image production device according to claim 7, wherein the region backfill section replaces the extracted group of pixels with pixels having a same pixel value as pixels in a vicinity of the extracted pixels.

9. A computer readable recording medium recording a program for causing a computer to execute:
    inputting a bitmap image obtained by scanning a document;
    specifying a region from the input bitmap image where a character or character string is inscribed, and extracting a group of pixels constituting only a foreground of a character or a character string to be processed from pixels constituting a background of the character or character string;
    discriminating the character or character string displayed by the extracted group of pixels;
    translating the discriminated character or character string, and obtaining a new group of pixels that draw a new character or character string obtained by the translation;
    replacing only the extracted group of pixels with other pixels obtained by performing predetermined interpolation processing, matching a value of the pixels constituting the character or character string in the specified region, with a value of pixels constituting the background in a vicinity of those pixels;
    obtaining a bitmap image of a translated document by writing the new group of pixels to the region in which the pixels have been replaced; and
    outputting the obtained bitmap image of the translated document.

10. The recording medium according to claim 9, wherein the replacing step comprises replacing the extracted group of pixels with pixels having a same pixel value as pixels in a vicinity of the extracted pixels.

* * * * *